(12) United States Patent
Al Moajil et al.

(10) Patent No.: US 11,787,997 B2
(45) Date of Patent: Oct. 17, 2023

(54) TREATMENT FLUID COMPOSITION FOR HIGH TEMPERATURE MULTI-STAGE FRACTURING APPLICATIONS

(71) Applicant: SAUDI ARABIAN OIL COMPANY, Dhahran (SA)

(72) Inventors: Abdullah Al Moajil, Dammam (SA); Waddah H. Almahri, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/655,695

(22) Filed: Mar. 21, 2022

(65) Prior Publication Data
US 2023/0295485 A1  Sep. 21, 2023

(51) Int. Cl.
*C09K 8/528* (2006.01)
*C09K 8/536* (2006.01)

(52) U.S. Cl.
CPC ............ *C09K 8/528* (2013.01); *C09K 8/536* (2013.01)

(58) Field of Classification Search
None
See application file for complete search history.

(56) References Cited

U.S. PATENT DOCUMENTS

| | | | |
|---|---|---|---|
| 5,890,536 A * | 4/1999 | Nierode | E21B 43/261 166/308.1 |
| 6,494,263 B2 | 12/2002 | Todd | |
| 6,534,449 B1 | 3/2003 | Gilmour et al. | |
| 6,638,896 B1 | 10/2003 | Tibbles et al. | |
| 7,134,496 B2 | 11/2006 | Jones et al. | |
| 2001/0036905 A1 | 11/2001 | Parlar et al. | |
| 2002/0117457 A1 | 8/2002 | Benton et al. | |
| 2003/0114318 A1 | 6/2003 | Benton et al. | |
| 2006/0102349 A1 | 5/2006 | Brady et al. | |
| 2006/0223714 A1 | 10/2006 | Svoboda et al. | |
| 2008/0110621 A1 | 5/2008 | Montgomery et al. | |
| 2009/0291863 A1 | 11/2009 | Welton et al. | |
| 2010/0160189 A1 | 6/2010 | Fuller et al. | |
| 2010/0212896 A1 * | 8/2010 | Navarro | C09K 8/36 507/239 |
| 2013/0133886 A1 * | 5/2013 | Quintero | E21B 43/16 166/279 |
| 2014/0311746 A1 | 10/2014 | Luyster et al. | |
| 2017/0145289 A1 | 5/2017 | Ba Geri et al. | |
| 2017/0190951 A1 | 7/2017 | Aldhufairi et al. | |
| 2019/0016947 A1 * | 1/2019 | Mahmoud | C09K 8/74 |
| 2019/0249071 A1 | 8/2019 | Ba Geri et al. | |
| 2021/0024809 A1 | 1/2021 | Ba Geri et al. | |
| 2021/0115322 A1 | 4/2021 | Mahmoud | |

FOREIGN PATENT DOCUMENTS

WO  2017120354 A1  7/2017

OTHER PUBLICATIONS

Al-Ibrahim, Hussain, et al., "Chelating Agent for Uniform Filter Cake Removal in Horizontal and Multilateral Wells: Laboratory Analysis and Formation Damage Diagnosis", SPE-177982-MS, Society of Petroleum Engineers, Apr. 2015, pp. 1-20 (20 pages).
Hassan, Amjed, et al., "Application of Chelating Agents in the Upstream Oil and Gas Industry: A Review", Energy & Fuels, ACS Publications, vol. 34, 2020, pp. 15593-15613 (21 pages).
Nasr El-Din, Mohamed Ahmed and Salaheldin Elkatatny, "Removal of Barite-Scale and Barite-Weighted Water—or Oil-Based-Drilling-Fluid Residue in a Single Stage", Mar. 2019 SPE Drilling & Cornletion, Society of Petroleum Engineers, 2019, pp. 16-26 (11 pages).
Office Action Issued in Corresponding U.S. Appl. No. 17/655,691, dated Jan. 19, 2023, 15 pages.

* cited by examiner

*Primary Examiner* — Andrew Sue-Ako
(74) *Attorney, Agent, or Firm* — Osha Bergman Watanabe & Burton LLP

(57) ABSTRACT

Provided is a method that may include introducing into a wellbore as a single stage treatment a composition that may include a fluid formulation that is a water-in-oil emulsion having an organic phase and an aqueous phase, the aqueous phase dispersed in the organic phase; maintaining the wellbore by shutting-in the well; and hydraulic fracturing the wellbore. The composition may contain a chelating agent and may interact with an oil-based sludge or filter cake, which may contain barite, at a target zone, allowing the composition to remove a portion of the oil-based mud sludge or filter cake.

20 Claims, No Drawings

TREATMENT FLUID COMPOSITION FOR HIGH TEMPERATURE MULTI-STAGE FRACTURING APPLICATIONS

BACKGROUND

In the oil and gas industry, fracturing is a common technique used to stimulate a petroleum-bearing rock formation and recover oil and gas through a wellbore. These fracturing techniques use a variety of fluids, including fracturing fluid and drilling fluid.

Drilling fluids are used to help drill wellbores into earth formations. Drilling fluids may be used to cool the drilling equipment, reduce friction between the drill bit and the wellbore surface, control the formation pressure, seal permeable formations, and maintain wellbore stability. Drilling fluids may create a hydrostatic pressure preventing fluids in the formations from penetrating a wellbore. Drilling fluids may include a weighting material that forms a sludge composed of organic matter, oil, drilling cuttings, and solid particles. Weighting materials are generally the main solid constituent of drilling fluids. Barite is often used to increase the weight and hydrostatic pressure of drilling fluids.

When oil-based mud (OBM) is used as a drilling fluid, sludge from the OBM can deposit in and around the wellbore. This OBM sludge can result in formation of "filter cake" or "mud cake" that comprises barite particles. Such filter cake is impermeable and highly insoluble in both water and acidic solutions, such as solutions of acetic acid, hydrochloric acid, and formic acid. A particular place that sludge can deposit is on formation entry points, where a fracturing mechanism introduces perforations into the formation. The sludge that deposits on formation entry points and resultant filter cake has the potential to resist fracturing. In some fracturing operations, such as hydraulic fracking, a buildup of sludge or filter cake may prevent fracturing from occurring as designed. When the buildup resists or prevents fracturing, the fracturing operation is compromised.

At completion of the drilling and before hydraulic fracking, the sludge or filter cake must be removed to allow production of the formation fluids or bonding of cement to the formation at the completion stage.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, provided is a composition that may include a fluid formulation that is a water-in-oil emulsion, having an organic phase and an aqueous phase, the aqueous phase dispersed in the organic phase. The organic phase may include an organic solvent, an emulsifier, and a wetting agent. The aqueous phase may include water and a chelating agent.

In another aspect, provided is a method that may include introducing a composition that is a water-in-oil emulsion into a wellbore as a single stage treatment such that it fluidly interacts with an oil-based mud sludge or a filter cake having barite at a target zone. The water-in-oil emulsion may have an organic phase and an aqueous phase. The organic phase may include an organic solvent, an emulsifier, and a wetting agent. The aqueous phase may include water and a chelating agent. The target zone may have a deposit of oil-based mud sludge or filter cake having barite. The method may also include maintaining the wellbore by shutting-in the well and allowing the composition to penetrate the oil-based mud sludge or filter cake having barite in a target zone, thereby allowing the composition to remove a portion of the oil-based mud sludge or filter cake having barite. The method may further include hydraulic fracturing the wellbore.

Other aspects and advantages of the claimed subject matter will be apparent from the following description and the appended claims.

DETAILED DESCRIPTION

In one aspect, embodiments disclosed herein relate to well treatment fluid compositions. The composition is a water-in-oil (w/o) emulsion of an organic solvent and an aqueous solution. The aqueous solution includes a chelating agent and has a "high pH," defined as a pH from 10-14. Stability of the emulsion is provided by use of a fatty acid-based emulsifier and a wetting agent.

In another aspect, a method of introducing the composition downhole in a cleanout operation is provided. The composition may be introduced ahead of a fracturing operation. In this way, sludge deposition that resists fracture initiation can be stimulated. The composition may stimulate an oil-based mud (OBM) sludge or filter cake. Stimulation may include penetration of the composition into a material. The filter cake may be a deposition from oil-based drilling fluid, OBM sludge, which may include barite particles and organic matter. These types of filter cake are commonly known in the art. The treatment method may provide a cleanout operation ahead of hydraulic fracturing by enhancing injectivity at the fracturing entry points.

Stimulation of the sludge deposition may provide for dissolution or removal of sufficient sludge for fracture initiation and successful fracturing operations, including multi-stage fracturing operations. Depending upon the composition of the sludge, treatment fluids herein may remove a majority of the sludge, and approximately 100 weight % (wt %) of the sludge in some embodiments. In one or more embodiments, stimulation by the composition may not dissolve the deposited sludge or filter cake completely; treatment fluids herein have been found to remove up to 40 wt %, up to 50 wt %, up to 60 wt %, up to 70 wt %, up to 80 wt %, or up to 90 wt % of a barite/oil-based mud sludge, for example. With this amount of sludge removal, passage of fracturing fluids through the treated sludge deposit or filter cake are sufficient to initiate a fracture (namely, through a fracture port) and provide for a successful fracturing operation.

Acid stimulation is a typical treatment used before multi-stage fracturing to remove deposited materials on formation, thereby, facilitate fracture initiation.

A main source of solids in an OBM filter cake are "barite particles," which means particles that include barium. Thus, barite particles are not limited to barite itself ($BaSO_4$), and may include barium salts, salts including barite, organometallic complexes including barium, organometallic complexes including barite, barium and barite alloys, barium and barite-based minerals, and the like. Barite is well known as a common weighting material used in drilling fluids for oil and gas wells. These drilling fluids may develop sludge in oil and gas wellbores, prior to fracturing operations. The oil-based mud sludge may include organic matter, OBM oil, barite particles, drilling cuttings, other solids, and intractable materials. The sludge may include a substantial amount of organic materials, such as in a range of from 40 to 60 wt % compared to the weight of the overall sludge composition, but the range is not limited thereto.

OBM having barite or OBM having barite particles may be called a barite-based OBM sludge. When the barite-based OBM sludge is hardened, it may form a filter cake. Likewise, filter cake having barite may be called a barite-based filter cake.

In general, scales including barite particles are pervasive and are difficult to remove, in part due to low solubility of barite in water. Barite's low solubility is about 2 milligrams per liter (mg/L). Barite may also be insoluble in aqueous fluids having a low pH, such as pH of less than 7, 6 or less, 5 or less, or 4 or less that may include hydrochloric acid (HCl), formic acid, citric acid, acetic acid, and other acids that may be commonly added to wellbore fluids, such as acid stimulation fluids. However, barite is moderately soluble in aqueous solutions that include chelating agents.

A chelating agent (derived from the Greek root of the Latin word chele, or "claw-shaped mechanism") is a molecule that includes two or more ligands with an ability to form coordinate covalent or ionic bonds with a target atom or molecule inside the ligand. These ligands effectively clamp (or claw) the target atom or molecule, with greater effectiveness than if the target atom or molecule were sequestered by electrostatic shielding without chelation. This clamping of the target atom or molecule is known in the art as a ligand field. The target atom or molecule may be a metal, an ion, an inorganic compound, an organic compound, or an organometallic compound. The target atom or molecule is often a metal or a salt thereof. In one or more embodiments, a target molecule for chelation includes barite particles.

Barite is moderately soluble in chelating agents such as ethylenediaminetetraacetic acid (EDTA) and diethylenetriaminepentaacetic acid (DTPA, or pentetic acid). Aqueous solutions including EDTA and DTPA may have a "high pH," meaning a pH of 10-14.

High pH fluids, however, have been found to be ineffective with oil-based mud sludge, as organic matter covering the surface of barite acts as a reaction barrier. Organic materials are insoluble in aqueous solutions and tend to dissolve well in solvents that have similar properties. However, high pH aqueous solutions (for example, DTPA-based and EDTA-based solutions) and organic solvents (for example, hydrocarbons) are not miscible. Because of this issue, in past methodologies, two stage treatments have been used. A two stage treatment may provide a first treatment stage to remove the organic matter and a second treatment stage to dissolve a portion of the barite materials. In contrast to these methods, embodiments herein provide a one-stage treatment fluid that may be used to both effectively remove organic materials and dissolve barite materials.

Treatment fluids according to embodiments herein, useful for one-stage treatment of barite/OBM sludge, may include an organic phase and an aqueous (non-organic) phase, emulsifying an organic solvent and a high pH chelating agent, as will be described further below. With use of fluids according to embodiments herein, sludge deposition that restricts fracture initiation during MSF (multi-stage fracturing) can be stimulated and penetrated. Such treatment may assure effective cleanout operation ahead of MSF to improve hydraulic fracturing effectiveness by enhancing injectivity, as compared to without treatment. Chemical treatment may also target the frac ports and not the entire wellbore. Overall, a one-stage treatment fluid may reduce chemical volumes and thus treatment costs, as compared to a multi-stage treatment.

A typical MSF completion may include wellbore casing and liner extending downward into the wellbore. The wellbore may include a wellbore isolator that may be a ball-actuated sliding sleeve or similar mechanism. The wellbore isolator can be run inside the liner or in the open hole. The mechanism of the isolator is known in the art. The wellbore may be vertical or horizontal. The production liner of an MSF completion includes a series of alternating isolation packers and frac ports, one after the other.

Well Treatment Compositions

In one or more embodiments, the well treatment composition according to embodiments herein is a fluid formulation that is an emulsion. In one or more embodiments, the emulsion is a water-in-oil (w/o) emulsion with a continuous organic phase and a dispersed aqueous phase. The organic and non-organic phases may be effectively stabilized by using an emulsifier and a wetting agent. Thus, the well treatment composition according to embodiments herein may be an emulsion including an aqueous phase, an organic phase, an emulsifier, and a wetting agent. In other embodiments, the well treatment composition according to embodiments herein may be an emulsion, such as a water-in-oil emulsion, where the organic phase includes an organic solvent, an emulsifier, and a wetting agent, and the aqueous phase includes water and a chelating agent. In one or more embodiments, the well treatment composition may further include a converting agent, and oxidizer or enzymes.

In one or more embodiments, the ratio between organic solvent and the chelating agent in the composition will be 20:80 or 30:70 volumetric ratio (organic: aqueous phase).

One or more embodiments of the well treatment composition is a water-in-oil emulsion that may retain stability up to 96 hours at 20° C. to 30° C., such as 25° C. For example, the emulsion may retain stability from 1 to 96 hours, 12 to 96 hours, 24 to 96 hours, 36 to 96 hours, 48 to 96 hours, 60 to 96 hours, 72 to 96 hours, or 84 to 96 hours.

In one or more embodiments, the well treatment composition has no overall pH value. The aqueous phase in the water-in-oil emulsions herein may be defined by a pH value, but the organic phase (oil phase) and the overall water-in-oil emulsion is not defined by a pH value.

The density of the well treatment composition may vary based on concentration of the components therein. The density may be as low as 0.8 grams per centimeter cubed ($g/cm^3$) for the organic phase, and as high as 1.17 $g/cm^3$ for the aqueous phase. The overall density of the well treatment composition may be as high as 1.03 $g/cm^3$. Densities are measured herein at room temperature, such as between temperatures of about 20 to 30° C. In some embodiments, densities may be defined as above for a temperature of 25° C.

The viscosity of the well treatment composition may vary based on concentration of the components therein. The viscosity of the composition may range from 50 to 500 centipoise (cP), such as from 80 to 200 cP. The upper range is not particularly limited and may be greater than 200 cP.

In one or more embodiments, the composition does not include a demulsifying agent. A demulsifying agent, as the name implies, will break up the emulsion, and embodiments of treatment fluid compositions herein may lose stability when a demulsifying agent is introduced in a range from 0.3 to 2 vol %, such as at 0.6 vol %.

In one or more embodiments, the composition does not include mutual solvent. A mutual solvent has also been found to destabilize embodiments of the emulsions disclosed herein. "Destabilize" in this instance means that an emulsion will not develop where a mutual solvent is use, or that the emulsion will be broken when using a mutual solvent. Examples of mutual solvents include, but are not limited to, ethylene glycol monobutyl ether (2-butoxyethanol), diethylene glycol butyl ether, and other modified glycol ethers.

Aqueous Phase

The aqueous phase of well treatment compositions according to one or more embodiments herein may include an aqueous solution comprising a chelating agent. The aqueous solution of yet other embodiments may include the chelating agent, water barite converting agent, enzyme, oxidizer, and optionally one or more additional components.

In one or more embodiments, the aqueous phase is in a volume range of from 30 to 90 volume percent (vol %) compared to the overall composition volume. For example, the aqueous phase may be in a range of from 40 to 90 vol %, 50 to 90 vol %, 55 to 85 vol %, 60 to 80 vol %, 65 to 75 vol %, or 68 to 72 vol % of the overall composition volume.

In one or more embodiments, the aqueous phase has a high pH in a range of from 7 to 14, such as from 8 to 14, from 9 to 14, or from about 10 to about 14. For example, the aqueous phase pH ("high pH") may be in a range from 10 to 13.5, 10 to 13, 10.5 to 14, 10.5 to 13.5, 10.5 to 13, 11 to 14, 11 to 13.5, 11 to 13, 11.5 to 14, 11.5 to 13.5, 11.5 to 13, or 12 to 13.

The high pH is sufficient to provide the solution with a molar concentration of base (or basic functional groups throughout the solution) in excess compared to the molar concentration of acid functional groups (total organic acid) on the chelating agent that is in the solution.

In one or more embodiments, the aqueous phase is reactive. "Reactive" means that compounds within the aqueous phase have the ability to react with barite particles or barite.

The water of the aqueous phase is not particularly limited and may include but is not limited to fresh water, deionized water, low salinity water, sulfate water, brine water, and salt water.

The aqueous phase includes a chelating agent. The chelating agent may contribute to the high pH of the aqueous phase. The chelating agent may be an organic compound or a salt thereof. The chelating agent includes ligands, which may be amines and acid functional groups, such as carboxylic acid or phosphonic acid. The carboxylic acid may be a carboxymethyl group covalently bonded to an amine. The amine may be two or more amines that are covalently attached through a carbon chain of two or more carbons.

In one or more embodiments, the aqueous phase has one or more chelating agent selected from the group consisting of DTPA (diethylenetriaminepentaacetic acid or pentetic acid), HEDTA (N-(hydroxyethyl)-ethylenediaminetetraacetic acid), EDTA (ethylenediaminetetraacetic acid), GLDA (glutamic acid-N, N-diacetic acid), HEIDA (hydroxyethyliminodiacetic acid), MGDA (methylglycinetetraacetic acid), EDDS (ethylenediamine-N,N-disuccinic acid), EGTA (ethylene glycol-bis-(P-aminoethylether)-N,N, N',N'-tetraacetic acid), NTA (nitrilotriaceticacid), CDTA (cyclohexanediaminetetraacetic acid), AMTP (aminotrimethylene phosphonic acid), E1EDP (1-hydroxy-ethylidene-1,1-diphosphonic acid), citrate, EDG (ethanoldiglycine), and a conjugate base of any of the preceding chelating agents. The chelating agent may act as a base by having a nitrogen group, a carboxylate (conjugate base of carboxylic acid), or a phosphate (for example, conjugate base of a phosphonic acid). Examples of conjugate base of a chelating agent include, but are not limited to $K_5$-DTPA, DTPA pentapotassium, DTPA pentapotassium hydroxide, glycine, N, N,-bis(2-bis(carboxymethyl)amino)ethyl-pentapotassium salt, pentapotassium-2-[bis(2-[bis(carboxymethyl)amine]ethyl))amino]acetate, $K_4$-EDTA, and tetrasodium EDTA.

In one or more embodiments, an aqueous base is included in solution with a chelating agent. For example, an aqueous base may be a converting agent. Although a converting agent has a function of converting $BaSO_3$, to be described, it may also be configured to obtain a conjugate base of a chelating agent. These basic compounds may be added to the mixture. As a non-limiting example, a basic converting agent when added to a solution containing a compound with a carboxylic acid is configured to react with the carboxylic acid and to form a conjugate base thereof (forming a carboxylate). In one or more embodiments, conjugate base variant of a chelating agent may be added to the solution.

In one or more embodiments, the chelating agent is in a concentration of up to 20 weight percent (wt %) of the overall weight of the aqueous phase. The chelating agent may be present at 0.435 to 0.7 moles per liter (M) of the composition.

A converting agent may be included in the aqueous phase. The converting agent may be an alkaline compound, a base, or both an alkaline and a basic compound. The converting agent includes but is not limited to one or more of: potassium salts such as potassium hydroxide, potassium carbonate, potassium cyanide, potassium formate, potassium nitrate, and potassium chloride; cesium salts such as cesium carbonate, cesium formate, and cesium chloride; sodium salts such as sodium hydroxide or sodium carbonate; lithium salts such as lithium carbonate and lithium formate: ammonium salts such as ammonium carbonate and ammonium chloride; calcium salts such as calcium chloride; and magnesium salts such as magnesium chloride.

The converting agent may be in a concentration of up to 10 wt % of the overall composition weight. Such a converting agent is soluble in the aqueous phase, and therefore a part of the aqueous phase. The converting agent may convert $BaSO_3$ to another barium-based compound, including, but not limited to, $BaCO_3$. Conversion of $BaSO_3$ may facilitate dissolution of the barium compound(s) in situ by way of barite interaction with the chelating agent. A suitable converting agent may be present in a range from about 3 to about 10 weight percent (wt %) of the overall composition weight, such as from 4 to 10 wt %, 5 to 10 wt %, 6 to 10 wt %, 7 to 10 wt %, 8 to 10 wt %, or 9 to 10 wt %.

The function of the converting agent includes converting barite to another barium-based compound with greater solubility, as compared to without the converting agent. However, general solubility of the composition may be greater when a chelating agent is included with a converting agent, as compared to a composition without a chelating agent.

An oxidizer or enzyme may also be included in the aqueous phase. The oxidizer or enzyme allows polymers in the filter cake to degrade. The oxidizer or enzyme may include, but is not limited to, a persulfate salt, such as potassium persulfate. Generally, an oxidizer may be included when polymers are present in an oil-based filter cake. The oxidizer or enzyme may be in a concentration of up to 10 weight percent (wt %) of the overall composition weight. While biopolymers are not typically used in oil-based drilling fluids, when there is a biopolymer in the drilling fluid, an enzyme such as alpha-amylase may be used.

Organic Phase

The organic phase (or oil phase) of the well treatment composition according to one or more embodiments herein may include an organic solvent, an emulsifier, and a wetting agent.

In one or more embodiments, the organic phase is in a volume range of from 10 to 70 vol % compared to the overall composition volume. For example, the organic phase may be in a range of from 10 to 60 vol %, 10 to 50 vol %, 15 to 45 vol %, 20 to 40 vol %, 25 to 35 vol %, or 28 to 32 vol % of the overall composition volume.

In one or more embodiments, the organic solvent is one or more selected from the group consisting of diesel fuel, oil/hydrocarbon, naphtha/naphthalene, aromatic solvents such as xylene, toluene, N-methylpyrrolidine, D-limonene/Terpene-based solvent, benzene sulfonic acid and derivatives thereof, ethoxylated alcohols, glycosides and derivatives thereof, and heavy naphtha or jet fuel range hydrocarbons.

In one or more embodiments, the organic solvent is in a weight range of from 20 to 40 wt % of the overall weight of the organic phase. For example, the organic solvent may be in a range of from 20 to 35 wt %, 23 to 35 wt %, 23 to 32 wt %, 23 to 30 wt %, 25 to 40 wt %, 25 to 35 wt %, 25 to 32 wt %, or 25 to 30 wt % of the overall weight of the organic phase.

In one or more embodiments, the emulsifier is in a weight range of from 0.5 to 10 wt % of the overall weight of the organic phase. For example, the emulsifier may be in a range of from 0.5 to 5 wt %, 0.5 to 4.5 wt %, 0.5 to 4 wt %, 0.5 to 3.5 wt %, 0.5 to 3 wt %, 0.5 to 2.5 wt %, 0.5 to 2 wt %, 1 to 5 wt %, 1 to 4.5 wt %, 1 to 4 wt %, 1 to 3.5 wt %, 1 to 3 wt %, 1 to 2.5 wt %, or 1 to 2 wt % of the organic phase.

In one or more embodiments, the emulsifier is in a volume range of from 0.5 to 5 volume percent (vol %) compared to the overall composition volume. For example, the emulsifier may be in a range of from 0.5 to 4 vol %, 0.5 to 3 vol %, 0.5 to 2.5 vol %, 0.5 to 2.0 vol %, 0.5 to 1.9 vol %, 0.5 to 1.8 vol %, 0.5 to 1.7 vol %, 0.5 to 1.6 vol %, 1.0 to 1.9 vol %, 1.0 to 1.8 vol %, 1.0 to 1.7 vol %, 1.0 to 1.6 vol %, 1.1 to 1.9 vol %, 1.2 to 1.8 vol %, 1.3 to 1.7 vol %, or 1.4 to 1.6 vol % of the overall composition volume.

The emulsifier may be based on a fatty acid, ethanol, and hydrocarbon. The emulsifier promotes water-in-oil emulsions. Fatty acid-based emulsifiers useful in embodiments herein may have a carboxylic acid functional group on a carbon chain of 4 to 28 carbon atoms. Advantageously, the emulsifier according to one or more embodiments may be used when the aqueous phase has a high pH.

An example of a fatty acid-based emulsifier in embodiments herein includes an amidoamine surfactant. A suitable example of such a fatty acid-based emulsifier is SUREMUL®, which is an amidoamine surfactant. SUREMUL® is available from M-I SWACO, LLC (Houston, Tex., USA). SUREMUL® includes: 60-100 wt % fatty acids that are tall-oil, or reaction products with diethylenetriamine, maleic anhydride, tetraethylenepentamine and triethylenetetramine (CAS No. 68990-47-6); 10-30 wt % 2-[2-(2-butoxyethoxy)ethoxy]ethanol (CAS No. 143-22-6); 5-10 wt % C14-C17 alkane hydrocarbons; and 5-10% C10-C14 alkane hydrocarbons.

Other suitable fatty acid-based emulsifiers may be similar to emulsifiers used in oil-based drilling fluids. Thus, the emulsifier may include one or more selected from the group consisting of fatty acid amides or fatty acid ethoxylates consisting of alkylated polyether chains, tall oil or long-chain alkyl fatty acids and salts thereof, alkyl oligoglycosides combined with fatty acids, fatty alcohol sulfates, alkyl fatty acid polyamide nonionic surfactants, carboxylic acid terminated fatty amine condensates, and starchamine. The emulsifier may include a compound having the formula "R—CO—NH—R'—NH$_2$" that is an amino acid amide. Free fatty acids and those corresponding to the general formula "R'—COOH" may be used as an emulsifier. In the above formulae, R and R' are each individually a saturated or unsaturated, branched, or unbranched alkyl group; R' may contain 11 to 21 carbon atoms in some embodiments.

In one or more embodiments, the wetting agent is in a weight range of from 0.5 to 10 wt % of the overall weight of the organic phase. For example, the wetting agent may be in a range of from 0.5 to 5 wt %, 0.5 to 4.5 wt %, 0.5 to 4 wt %, 0.5 to 3.5 wt %, 0.5 to 3 wt %, 0.5 to 2.5 wt %, 0.5 to 2 wt %, 1 to 5 wt %, 1 to 4.5 wt %, 1 to 4 wt %, 1 to 3.5 wt %, 1 to 3 wt %, 1 to 2.5 wt %, or 1 to 2 wt % of the overall weight of the organic phase.

In one or more embodiments, the wetting agent loading is 0.1 to 5 volume percent (vol %) of the overall composition volume. The wetting agent may be from 0.1 to 4 vol %, 0.1 to 3 vol %, 0.1 to 2 vol %, 0.1 to 1.9 vol %, 0.1 to 1.8 vol %, 0.1 to 1.7 vol %, 0.1 to 1.6 vol %, 0.5 to 5 vol %, 0.5 to 4 vol %, 0.5 to 3 vol %, 0.5 to 2 vol %, 0.5 to 1.9 vol %, 0.5 to 1.8 vol %, 0.5 to 1.7 vol %, 0.5 to 1.6 vol %, 1.0 to 1.9 vol %, 1.0 to 1.8 vol %, 1.0 to 1.7 vol %, 1.0 to 1.6 vol %, 1.1 to 1.9 vol %, 1.2 to 1.8 vol %, 1.3 to 1.7 vol %, or 1.4 to 1.6 vol % of the overall composition volume.

In one or more embodiments, the wetting agent includes amidoamine, fatty acid, or amidoamine and fatty acid. The wetting agent allows emulsion stability to be retained. Emulsion stability is, in part, a measure of how long the emulsion remains intact as designed, before separating out or dissipating. Emulsion stability may be manipulated by changing the wetting agent loading.

A suitable example of a wetting agent is SUREWET® which is available from M-I SWACO, LLC (Houston, Tex., USA) and was used in the below examples. This may be referred to as an amidoamine surfactant.

As previously mentioned, the composition may include a chelating agent. The chelating agent may be present in an amount up to about 30 volume percent (vol %), such as up to about 25 vol %, of up to about 20 vol % of the overall well treatment composition. For example, the chelating agent may be in a range of from about 10 vol % to about 35 vol %, from about 15 vol % to about 35 vol %, from about 15 vol % to about 30 vol %, or from about 15 vol % to about 25 vol %, based on the overall volume of the well treatment composition.

Other suitable wetting agents include, but are not limited to, amidoamines, long-chain alkyl quaternary ammonium salt cationic surfactants, treated vegetable oil fatty acids, carboxylic acid terminated polyamides, and oleic acid-based surfactants. The wetting agent may also be a molecule that is made from the condensation reaction between unreacted and unmodified fatty acids and polyamine.

Method of Forming the Well Treatment Composition

In one or more embodiments, the method includes mixing the respective components to form the organic phase and aqueous phase separately. The method includes combining the aqueous mixture and the organic mixture and emulsifying them, thereby forming a water-in-oil emulsion. The order of mixing is not limited and may include addition of the aqueous phase to the organic phase, while mixing, in some embodiments.

Methods of Treating a Wellbore

In one or more embodiments, methods for treating a wellbore may include introducing the composition into a wellbore as a single stage treatment. The wellbore temperature may be 37° C. or greater (about 100° F.), such as 93° C. or greater (about 200° F.), 120° C. (about 250° F.) or greater, 150° C. or greater (about 300° F.), or 180° C. or greater (about 350° F.). The wellbore temperature may be from 120° C. to 180° C. The method may be used as part of a procedure for acid stimulation treatment.

The method may include introducing a composition according to one or more embodiments herein into a wellbore, after OBM is used in said wellbore. The wellbore may be a high temperature gas well, or other suitable well type. When the composition is introduced into a wellbore ahead of a fracturing treatment, such as MSF, it fluidly interacts with (contacts) OBM sludge and filter cake at a target site. The interaction includes penetrating into the barite-based OBM sludge or filter cake with the composition. A target site is a location in the wellbore where fracturing will occur, such as at the frac ports.

A target zone is the general area of the wellbore that fracturing will occur. For example, where multi-stage fracturing is involved, there are multiple frac ports across a target zone. One or more individual frac port in this instance is a target site. So, there may be one or more target sites in a target zone.

In one or more embodiments, the method treats the target zone or the target site and does not treat the entire wellbore. Introducing the composition at a target zone or a target site reduces the total volume of the composition used and the treatment cost, compared to treating the entire wellbore.

In one or more embodiments, coiled tubing or bullheading operation from the surface may be used to introduce the composition into the wellbore. Typical pumping units for drilling or coiled tubing operations may be used. In another one or more embodiments, no drill pipe is included. That is, the method introduces the composition into a wellbore after a drilling operation. However, if the method is to be used during drilling operations, then the method may include spotting the composition in the wellbore using drill pipe and kept for at least about 24 hours, such as from 24-48 hours, or up to 24-48 hours. This time period allows for reaction of emulsion with the filter cake.

The treatment pressure during fracturing operations is not particularly limited and it may be in a range of from, for example, 8,000 to 13,000 pounds per square inch (psi) (55 to 90 megapascal (mPa)). The treatment pressure may also be above about 400 psi (about 3 mPa), about 1000 psi (about 7 mPa), about 2000 psi (about 14 mPa), about 3000 psi (about 21 mPa), about 4000 psi (about 28 mPa), about 5000 psi (about 35 mPa), about 6000 psi (about 41 mPa), about 7000 psi (about 48 mPa), or about 8000 psi (55 mPa).

The pumping rate may be in a range of from 30 to 40 barrels per minute (bbl/min) (4.7 to 6.4 cubic meters per minute ($m^3$/min)). If coiled tubing is used, then the pumping rate may be in a range of from 2 to 8 bbl/min (0.3 to 1.3 $m^3$/min).

Introducing the composition to the target zone in the wellbore enhances the solubility of sludge and debris, compared to without introducing the composition to the target zone. One or more embodiments of the method includes maintaining the wellbore, which includes a period of time that allows the composition to penetrate the OBM sludge and filter cake.

In one or more embodiments, steps in the method are repeated in multi-stage fracturing. In this way, the method may be performed at a fracture interval individually. Additionally, the method may be performed in series or in sequence in relation to the multiple fracturing intervals.

Depending on the fracturing operation, maintaining the wellbore may include shutting in the well (such as at the wellhead). When a shut-in procedure is used, the composition that was introduced has time to act upon the OBM sludge and filter cake and a shut-in time may be from about 2 hours to about 24 hours. However, there may be no shut-in time for the composition, as one or more embodiments of the method includes using the composition as breakdown fluid during fraccing operations.

In general, a break down fluid such as 26 wt % HCl may be introduced first, followed by the composition of one or more embodiments, mutual solvent pill, then fraccing fluids.

For example, in a general process of hydraulic fracturing operations, break down fluids may initially be introduced to initiate a fracture, then linear and cross-linked fluids with proppants are introduced to allow the fracture to close on the proppant particles (i.e. packed with proppant particles). Thus, fracture permeability is higher than reservoir permeability. Typical breakdown fluids include but are not limited to 26 wt % HCl. In one or more embodiments, both 26 wt % HCl and the composition for fracture stages are presented for those stages that cannot be initiated with 26 wt % HCl or other typical breakdown fluid.

The well treatment composition may remove up to 40 to 50 wt % of deposited OBM sludge and filter cake having barite particles, such as at least about 40 wt % or at least about 50 wt %. This deposit removal is sufficient to facilitate fracture initiation during MSF completion. In some instances, the well treatment composition may remove greater than 50 wt % of the deposited OBM sludge and filter cake having barite particles. In other instances, the well treatment composition may remove about 20 vol % or more, 25 vol % or more, 30 vol % or more, 35 vol %, or more 40 vol % or more, 45 vol % or more, or 50 vol % or more of the deposited OBM sludge and filter cake having barite particles.

According to one or more embodiments, the amount of the well treatment composition needed to dissolve 1 gram (g) of OBM sludge and filter cake having barite particles may be about 10 milliliters (mL) (10 mL/g), such as about 10 mL/g or greater, or 10 mL/g or greater.

When the step of maintaining the wellbore is complete, fracture stage initiation may proceed at a port (perforation), which was previously damaged by OBM sludge and filter cake having barite particles.

One or more embodiments of the method includes a fracturing step. The fracturing step may be hydraulic fracturing. In one or more embodiments, when multi-stage fracturing is used as the fracturing step, the type of fracturing will be hydraulic or propped fracturing.

The method of the present disclosure is applicable in numerous environments. The method can be used to remove barite in sludge or filter cake produced from drilling, production, completion, workover, or stimulation activity, either produced intentionally or unintentionally. It can be used in screen-only completions and gravel pack completions, an open hole and a cased hole, vertical and highly deviated wells; single-application soak or circulating fluid in which the well treatment composition of the present disclosure also serves as a carrier fluid for, e.g., a gravel pack operation; in conjunction with a gelling agent or viscoelastic surfactant or alone, and with a variety of clean-up tools. More particularly, the composition and methods of the present disclosure may be used whenever it is desirable to remove a barite in sludge or filter cake from a wellbore or near-wellbore region in a formation, regardless of whether the sludge or filter cake is produced during drilling or during other post-drilling operations (e.g., fluid-loss control, gravel pack operation, fracturing, matrix acidizing, etc.).

Regarding the high pH of the composition and interaction between barite, where chelating agents such as EDTA and DTPA are at a pH above about 10, such as pH 10 to 12 or above, a fully deprotonated species may predominate, with carboxylates rather than acids. For EDTA, the predominant species may be EDTA$^{4-}$ with HEDTA$^{3-}$ present. For DTPA, the predominant species may be DTPA$^{5-}$ with HDTPA$^{4-}$ present. A reaction between Ba$^{2+}$ (in barite, BaSO$_4$) and either EDTA$^{4-}$ or HEDTA$^{3-}$ may produce BaEDTA$^{2-}$. That is, HEDTA$^{3-}$ may release a proton upon complexation with Ba$^{2+}$ at high pH. Similarly, either DTPA$^{5-}$ or HDTPA$^{4-}$ may produce BaDTPA$^{3-}$ upon complexation with Ba$^{2+}$ at high pH. HDTPA$^{4-}$ may release a proton during the reaction. Thus, when using the composition and method of one or more embodiments, a similar barium chelate may be obtained in the case of EDTA or DTPA, respectively.

In addition to barite itself, a plethora of barium complexes may exist downhole. When a chelating agent of one or more embodiments of the composition (not limited to EDTA or DTPA) contacts barium or barite particles at high pH, the chelating agent may form a chelation complex with these various barium or barite particles. These chelation complexes serve a similar purpose as an ideal barium chelation complex, as previously presented.

Further, the chelating agent in the composition at high pH may strip alloys and salts of barium, where those alloys originate from barite or barite particles.

Without wanting to be bound by theory, it is predicted that the method includes chelation of barium at high pH, even when diverse types of molecules originating from barite are present. Diverse types of molecules originating from barite may include but are not limited to barium alloys and minerals. These compounds may include but are not limited to Ba(M)SO$_4$ (where M is a metal), BaCO$_3$ and BaCl$_2$. These diverse types of molecules may be removed from the OBM sludge and filter cake by the composition and method of one or more embodiments.

In one or more embodiments, the water-in-oil emulsion traps a barium chelate complex in the dispersed (aqueous) phase, surrounding it with the oil phase. Advantageously, this chelation of metal and trapping of organometallic (barium chelate complex) in the water-in-oil emulsion effectively removes the barium or barite particle from the reaction equilibrium at the target site. This is different than, for example, removing a barium or barite particle with aqueous solution alone (or with an oil-in-water emulsion, a two stage treatment, or a similar conventional method of barite removal). That is, conventional methods of sequestering or removing barite particles allow barite particles to remain in fluidic contact through solution with the OBM sludge and filter cake.

EXAMPLES

The following examples include a showing of the solubility of oil-based mud (OBM) sludge or filter cake having barite using the composition of one or more embodiments. The examples do not include field trials.

Oil-Based Mud Sludge Having Barite

The samples of oil-based mud sludge having barite (or barite-based OBM sludge), also called filter cake having barite, were synthesized in the lab. These samples may include the following: bicarbonate at 9,882 milligrams per liter (mg/L), carbonate from 65,520 to 68,580 mg/L, barium from 4,300 to 6,624 mg/L, calcium at 4,406 mg/L, chloride from 14,723 to 18,129 mg/L, magnesium at 792 mg/L, potassium from 14,4156 to 14,7968 mg/L, sodium from 4,600 to 7,003 mg/L, strontium from 13 to 33 mg/L, sulfate from 368 to 453 mg/L, and a specific gravity at 60° F. of 1.224 to 1.235 grams per milliliter (g/mL) (or grams per centimeter cubed (g/cc)).

The samples of OBM sludge having barite were analyzed by XRF/XRD, initially dried prior to analysis. Composition data is shown in Tables 1 to 3.

TABLE 1

Molecular Composition of Oil-Based Mud Sludge having Barite

| Compound | Weight percent |
|---|---|
| Barite (BaSO$_4$) | 73 |
| Calcite (CaCO$_3$) | 8 |
| Dolomite (CaMg(CO$_3$)$_2$) | 10 |
| Quartz (SiO$_2$) | 6 |
| Halite (NaCl) | 3 |
| Microcline (KAlSi$_3$O$_8$) | Trace |

TABLE 2

Elemental Composition of Oil-Based Mud Sludge having Barite

| Element | Weight percent |
|---|---|
| Barium (Ba) | 43 |
| Sulfur (S) | 10 |
| Calcium (Ca) | 5.3 |
| Silicon (Si) | 2.7 |
| Chlorine (Cl) | 1.6 |
| Magnesium (Mg) | 1.4 |
| Sodium (Na) | 1 |
| Iron (Fe) | 0.2 |
| Cesium (Cs) | 0.1 |
| Aluminum (Al) | 0.01 |

TABLE 3

Ionic Concentrations of Oil-Based Mud Sludge having Barite, initially dried prior to analysis.

| Ion | Concentration (mg/L) |
|---|---|
| Bicarbonate | 9,882 |
| Carbonate | 65,520 to 68,580 |
| Barium | 4,300 to 6,624 |
| Calcium | 4,406 |
| Chloride | 14,723 to 18,129 |
| Magnesium | 792 |
| Potassium | 144,156 to 147,968 |
| Sodium | 4,600 to 7,003 |
| Strontium | 13 to 33 |
| Sulfate | 368 to 453 |

In the Examples, the specific gravity of the oil-based mud sludge or filter cake having barite (initially dried prior to analysis) at 60° F. is 1.224 to 1.235 g/mL (or g/cc).

Example 1

A well treatment composition was prepared based on a 70/30 volume fraction between aqueous phase and the organic phase. A glass container was used to mix the organic phase with: 1.5 vol % of the emulsifier (SUREMUL®), 1.5 vol % of the wetting agent (SUREWET®), and 27 vol % of diesel fuel. In a separate glass container, the aqueous phase of chelating agent was prepared. Although a typical aqueous phase composition may include water, DTPA, and converting agent, the aqueous phase of Example 1 included water and BaraDis™ at a ratio such that the chelating agent DTPA (pentetic acid or diethylenetriaminepentaacetic acid) was present at about 20 vol % (of the overall composition volume). It is noted that BaraDis™ as commercially available includes converting agent and cellulose/sucrose enzymes. While the enzyme is present in this example, due to the nature of the sludge being tested, it is unlikely that the enzymes had an effect on the present test results. BaraDis™ is available from Smart Energy Support Services Co. Ltd. (SESS) (formerly known as Modern National Chemicals). A funnel was used to add the aqueous phase into the organic phase, to obtain a mixture. The mixture of aqueous and organic phases was stirred to obtain the water-in-oil emulsion. The water-in-oil emulsion also included 10 to 15 vol % converting agent (potassium carbonate).

DTPA in BaraDis™ is estimated to include about 20 wt % DTPA (such as $K_5$-DTPA) in the BaraDis™ solution, or about 0.4 to about 0.6 mol/L of DTPA in the overall volume of the aqueous phase.

Conductivity Test

Conductivity tests on the water-in-oil emulsion of Example 1 showed zero conductivity. Thus, the structure of the water-in-oil emulsion was confirmed and proven to have good initial stability.

Drop Test

In the drop test, a drop of the water-in-oil emulsion of Example 1 was added to a large volume of water. The test proceeded by observing the single drop over a period of about 8.5 hours. Results of the drop test indicated 7 to 8 hours stability was reached when 1.5 wt % emulsifier agent was used along with 1.5 wt % of wetting agent. After 7 to 8 hours, the water-in-oil emulsion of Example 1 began to break apart in the water. In the drop tests, 18 hours of emulsion mixing was used to reach 7 to 8 hours of stability.

Obtained results from drop test revealed that emulsion stability can be manipulated by changing wetting agent loading.

Stability Test

The water-in-oil emulsion of Example 1 showed stability for 96 hours or more (no phase separation occurred when the solution remained stagnant (no mixing)). The stability test was conducted at room temperature by placing a quantity of the emulsion of Example 1 in a vial and observing the emulsion over a time period of 96 hours.

In a negative control test for stability, a demulsifying agent was added to the water-in-oil emulsion of Example 1. Before adding the demulsifying agent, the concentrations of all additives were the same as the stability test. Results of the negative control test showed that the water-in-oil emulsion of Example 1 is immediately broken by adding 0.6 vol % demulsifying agent. In this negative control test, the demulsifying agent was "W054" (available from Schlumberger, USA) and is mainly composed of methanol, oxyalkylated alkyl alcohol, heavy aromatic naphtha, and quaternary ammonium compound.

Solubility Test

Multiple solubility tests were performed using the water-in-oil emulsion of Example 1. These tests investigated the ratio between organic solvent and chelating agent, and the additives that create a stable emulsion.

To demonstrate the dissolution of a mixture of barite and organic material, solubility tests were conducted on samples of the OBM sludge having barite (or barite-based filter cake, as it is dried OBM sludge having barite). The samples to be tested were prepared in a laboratory. The water-in-oil emulsion of Example 1 was used to run stability tests at high temperature (154° C. in this example) and room temperature (21° C. in this example).

The OBM sludge mass to Example 1 emulsion volume ratio was 1:10, or 1 gram (g) of sludge per 10 milliliters (mL) of water-in-oil emulsion. Table 4 shows the solubility test results at high temperature and room temperature.

TABLE 4

Solubility Tests.

| Sample Name | High Temperature | Room Temperature |
|---|---|---|
| Solvent | High pH DTPA/Diesel | |
| Ratio (filter cake mass in grams to emulsion volume in cubic centimeters) | 1:10 | 1:10 |
| Temperature, ° C. (° F.) | 154 (310) | 21 (70) |
| Soaking Time, hours | 24 | 24 |
| wt % Dissolved | 53% | 28% |

The results of Table 4 show that barite-based OBM sludge (barite-based filter cake) solubility increased (increased wt % dissolved) as the temperature increased from room temperature to high temperature.

In the high temperature solubility experiment at 154° C. (310° F.) for 24 hours, the filter cake was hardened with large visible cracks in the surface. Further, some large pieces of the filter cake were broken off from the main filter cake, without intervention.

In the room temperature solubility experiment at 21° C. (70° F.) for 24 hours, the filter cake was hardened with many mudcracks (desiccation cracks) compared to the high temperature solubility experiment. However, the filter cake appeared to remain intact, with no pieces broken off from the main filter cake.

Comparative Example 1

An OBM sludge sample was treated with DTPA-based fluid at 149° C. (300° F.) and showed 20% solubility, as shown in Table 5.

TABLE 5

Solubility of barite/oil-based mud sludge in comparative example, with chelating agents (without emulsion according to one or more embodiments).

| Compound | DTPA-based, 5-10% mutual solvent (two-stage) |
|---|---|
| Solubility, wt % | about 60 |
| pH | 10 to 12.5 |
| Density change, g/cm$^3$ | 1.19 to 1.13 |
| Soaking time, hours | 16 |
| Temperature, ° F. (° C.) | 310 (154) |
| Solid (grams):liquid (cubic centimeter) ratio | 1:10 |

Table 6 shows the composition of the OBM sludge sample. However, the sludge is not intended to be reproduced, as the sludge is normally obtained from the field. The sludge is meant to represent that which would be obtained from a fraccing operation, when frac initiation fails with an inorganic composition (which may include some organic material) similar to the one below.

Units for Table 6 are as follows: barrel (bbl) (1 bbl=0.16 m$^3$), pound (lb) (1 lb=0.454 kg), second (sec), minute (min), pound per cubic feet (lb/ft$^3$) (1 lb/ft$^3$=16 kilogram per cubic meter (kg/m$^3$)), and pound per 100 square feet (lb/100 ft$^2$) (1 lb/100 ft$^2$=4.88 kilogram per 100 square meter (kg/100 m$^2$)).

TABLE 6

Oil-based drilling fluid general recipe.

| Material/Property | Function | Value | Unit | Property | Value | Unit |
|---|---|---|---|---|---|---|
| Water |  | 0.15-0.17 | bbl | Density | 83-95 | lb/ft$^3$ |
| diesel | Base fluid | 0.6-0.67 | bbl | Yield Point | 12-22 | lb/100 ft$^2$ |
| CaCl$_2$ | Weighting agent | 16-18 | lb | Gels, 10 sec | 8-11 | lb/100 ft$^2$ |
| Amine-treated lignite | Polymeric fluid loss reducer | 8-12 | lb | Gels, 10 min | 12-16 | lb/100 ft$^2$ |
| Organophilic clay or | Viscosifier | 6-9 | lb |  |  |  |
| Organic surfactant | wetting agent/emulsifier | 1.2-8 | lb |  |  |  |
| Organic surfactant | emulsifier | 0..35-4 | lb |  |  |  |
| surfactant | Oil wetting agent | 0.3-4 | lb |  |  |  |
| Synthetic fluid | Rheological properties enhancer | 0.25-2 | lb |  |  |  |
| Lime | pH control/calcium source | 5-8 | lb |  |  |  |
| Calcium Carbonate, d-25 | Bridging agent | 5 | lb |  |  |  |
| Calcium Carbonate, d-50 | Bridging agent | 5 | lb |  |  |  |
| Sized graphite | Lost-circulation/seepage agent | 2 | lb |  |  |  |
| Sized graphite-fine | Lost-circulation/seepage agent | 4 | lb |  |  |  |
| Barium sulfate, barite | Weighting agent | 200-240 | lb |  |  |  |

These examples show that the chelating agent (DTPA) itself dissolved about 20 wt % of the OBM sludge having barite, and that the composition of one or more embodiments including the chelating agent (DTPA) dissolved greater than 40 wt % of the oil-based mud sludge based on barite.

The mass removed (wt %) by from the filter cake includes barite. In one or more embodiments, the spent composition includes 4,000 to 6,000 milligrams per liter (mg/L) of barium (after reaction with the sludge).

In one or more embodiments, the total dissolved solids after reaction of chelating agent with the barite/oil-based mud sludge was about 338,000 to 349,000 milligrams per liter (mg/L).

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, up to ±5%, up to ±2%, up to ±1%, up to ±0.5%, up to ±0.1%, up to ±0.01%, up to +10%, up to +5%, up to +2%, up to +1%, up to +0.5%, up to +0.1%, up to +0.01%, up to −10%, up to −5%, up to −2%, up to −1%, up to −0.5%, up to −0.1%, or up to −0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. A method, comprising:
   introducing a composition that is a water-in-oil emulsion into a wellbore as a single stage treatment such that it fluidly interacts with an oil-based mud sludge or a filter cake at a target zone,
   wherein the composition does not include a mutual solvent;
   wherein the water-in-oil emulsion has an organic phase and an aqueous phase, the organic phase comprising an organic solvent, an emulsifier, and a wetting agent, and the aqueous phase comprising water and a chelating agent,
   wherein the oil-based mud sludge or the filter cake comprises barite;
   wherein the target zone has a deposit of the oil-based mud sludge or the filter cake;
   maintaining the wellbore by shutting-in the wellbore and allowing the composition to penetrate the oil-based mud sludge or the filter cake in a target zone, thereby allowing the composition to remove a portion of the oil-based mud sludge or the filter cake; and
   hydraulic fracturing the wellbore.

2. The method of claim 1, wherein the target zone is a fracture port.

3. The method of claim 1, wherein the method is repeated in multi-stage fracturing.

4. The method of claim 1, wherein the aqueous phase has a pH in a range of from 7 to 14.

5. The method of claim 1, wherein the aqueous phase has a pH in a range of from 10 to 14.

6. The method of claim 1, wherein the target zone of the wellbore has a temperature of from 120° C. to 180° C.

7. The method of claim 1, wherein the target zone of the wellbore has a pressure of above about 400 psi.

8. The method of claim 1, wherein at least about 40 wt % of the oil-based mud sludge or the filter cake is removed from the wellbore.

9. The method of claim 1, wherein at least about 50 wt % of the oil-based mud sludge or the filter cake is removed from the wellbore.

10. The method of claim 1 comprising allowing the composition to penetrate the wellbore for at least about 24 hours.

11. The method of claim 1, wherein the water-in-oil emulsion has a viscosity of 80 to 200 cP at 20 to 30° C.

12. The method of claim 1, wherein the organic phase further comprises ethanol and a hydrocarbon.

13. The method of claim 1, wherein the organic phase is from 10 to 70 vol % of an overall composition volume.

14. The method of claim 1, wherein the aqueous phase is from 30 to 90 vol % of an overall composition volume.

15. The method of claim 1, wherein the emulsifier is a fatty acid-based emulsifier.

16. The method of claim 1, wherein the emulsifier is in a range of from 0.5 to 5 vol % of an overall volume of the organic phase.

17. The method of claim 1, wherein the organic solvent is one or more selected from the group consisting of diesel fuel, oil/hydrocarbon, naphtha/naphthalene, xylene, toluene, N-methylpyrrolidine, D-limonene/Terpene-based solvent, benzene sulfonic acid and derivatives thereof, ethoxylated alcohols, glycosides and derivatives thereof, and heavy naphtha or jet fuel range hydrocarbons.

18. The method of claim 1, wherein the organic solvent is in a range of from 20 to 40 wt % of an overall weight of the organic phase.

19. The method of claim 1, wherein the wetting agent is one or more selected from the group consisting of an amidoamine, an alkyl quaternary ammonium salt cationic surfactant, a treated vegetable oil fatty acid, a carboxylic acid terminated polyamide, and an oleic acid-based surfactant.

20. The method of claim 1, wherein the wetting agent is in a range of from 0.5 to 5 vol % of the overall composition volume.

* * * * *